UNITED STATES PATENT OFFICE.

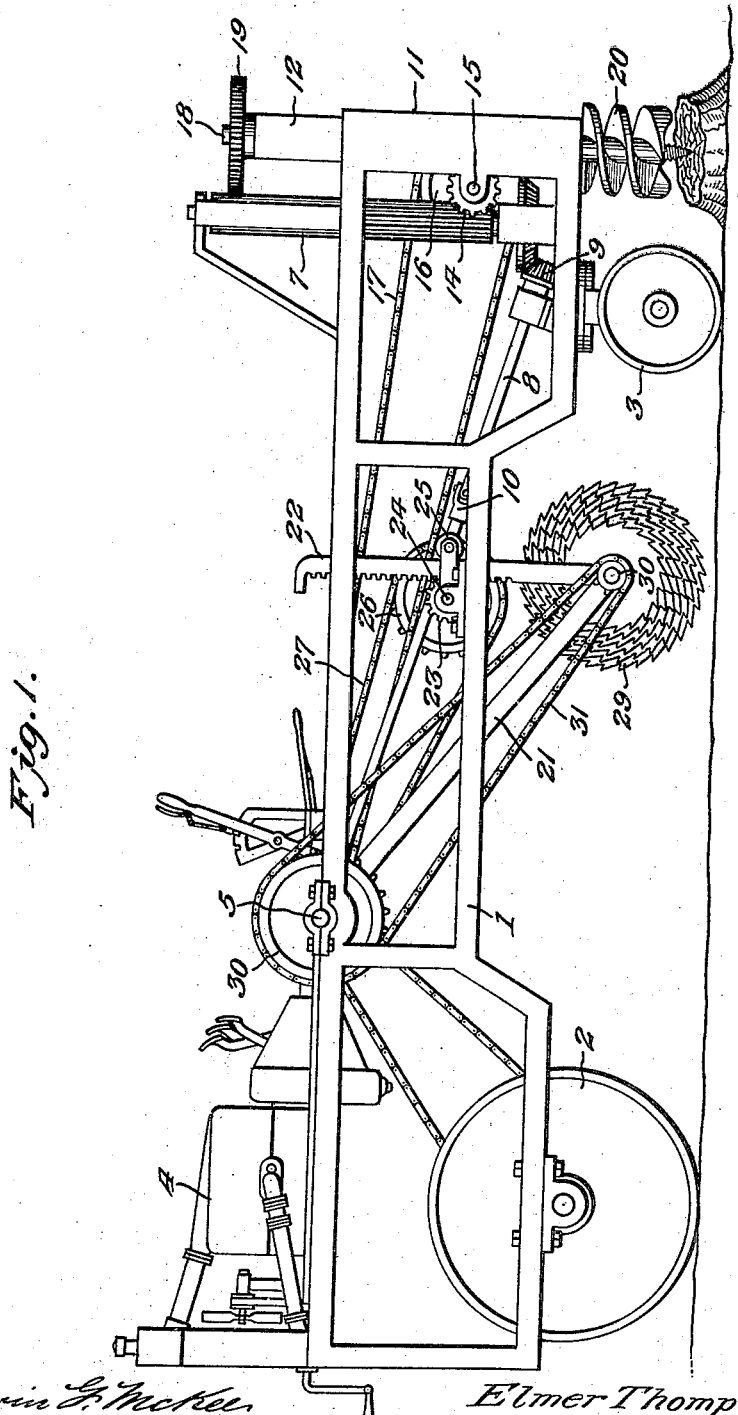

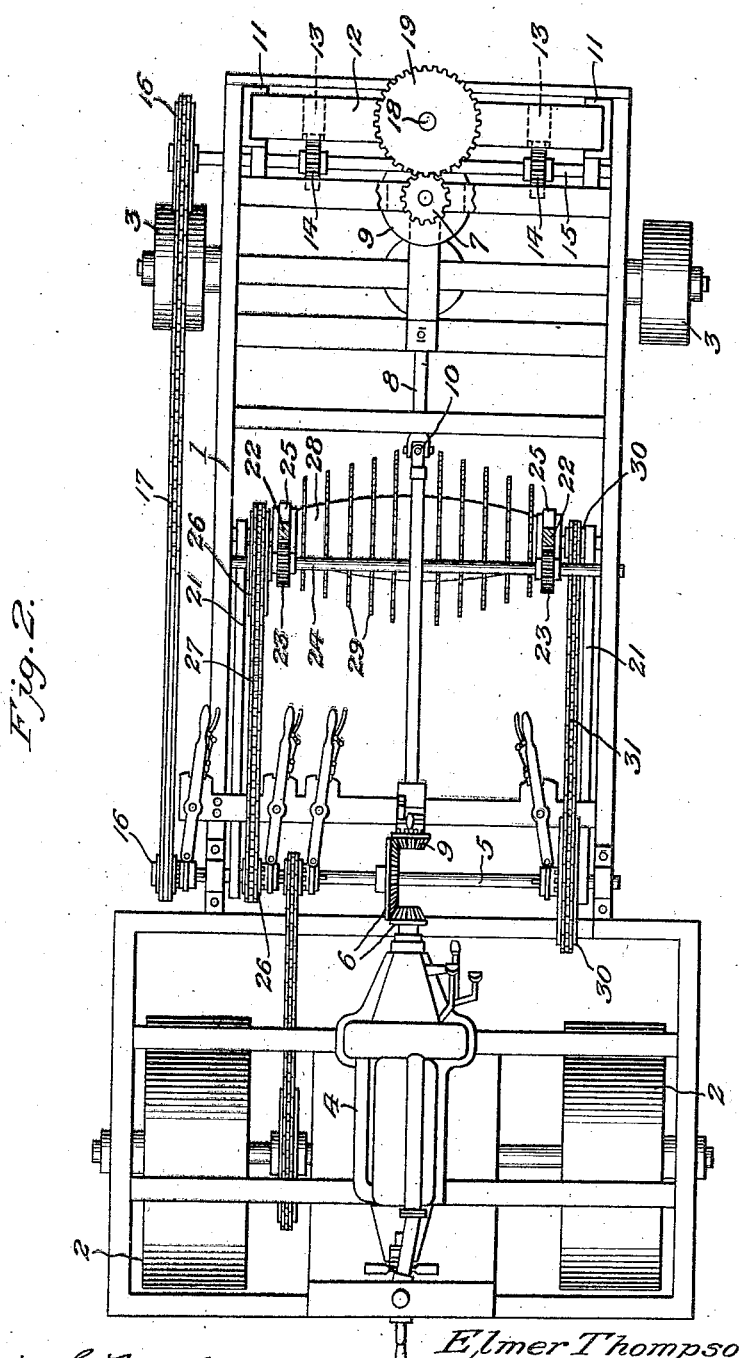

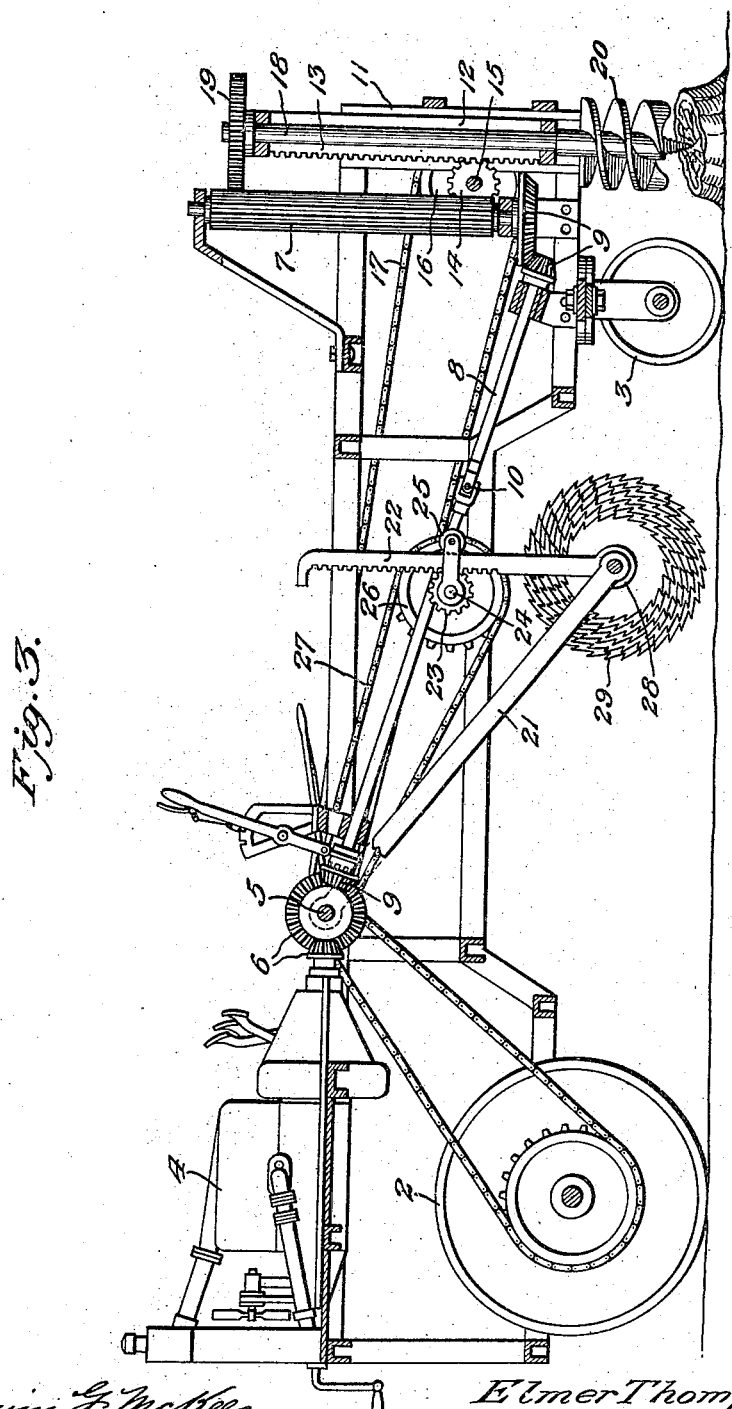

ELMER THOMPSON, OF EAU CLAIRE, WISCONSIN.

POWER GRUBBER.

1,417,425.  Specification of Letters Patent.  Patented May 23, 1922.

Application filed December 14, 1920. Serial No. 430,744.

*To all whom it may concern:*

Be it known that I, ELMER THOMPSON, a citizen of the United States, residing at Eau Claire, in the county of Eau Claire and State of Wisconsin, have invented new and useful Improvements in Power Grubbers, of which the following is a specification.

This invention relates to means for removing stumps from the ground, the principal object of the invention being to provide means for boring out the stump by a large power driven auger.

Another object of the invention is to provide means for cutting the roots and the main parts of the stump into small pieces by a plurality of saws which are also power driven.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a side view of the invention.

Figure 2 is a plan view.

Figure 3 is a longitudinal sectional view.

In these views 1 indicates the frame of the apparatus which is supported on the rollers 2 at the rear of the frame and the wheels 3 at the front thereof. The rollers at the rear are suitably driven from the motor 4 which is located on the frame. A transversely arranged shaft 5 is suitably journaled in the frame and this shaft is geared to the motor shaft by means of the gears 6. A vertically arranged roller gear 7, of great length, is journaled in the front part of the frame and this gear is connected with the shaft 5 by means of the shafting 8 and the gears 9. This shafting is provided with a universal joint 10. Vertically arranged guideways 11 are located at the front of the frame and a block 12 is slidably mounted in said guideways. Racks 13 are formed on the inner face of said block and these racks are engaged by toothed wheels 14 located on a shaft 15 which is journaled in the front part of the frame. This shaft is driven from shaft 5 by means of the sprockets 16 and chain 17. A vertically arranged shaft 18 is rotatably carried by the block and the upper end of this shaft carries a toothed wheel 19 which engages with the roller gear 7. The lower end of the shaft is formed to receive a large auger 20.

It will thus be seen that the block can be moved vertically in its guideways by rotating the shaft 15 from the drive shaft 5. This movement being imparted to the block by the toothed wheels 14 engaging the racks on the block. While the block is moving the toothed wheel 19 on shaft 18 will slide on the gear roller 7 so that said roller 7 can be made to revolve the shaft 18 in all positions of the block.

The frame is undercut to provide a recess and a roller supporting frame 21 is pivotally mounted in this recess by having its rear part pivoted to a part of the main frame and its front part being provided with racks 22 which engage toothed wheels 23 arranged on a shaft 24 which is journaled in the main frame. Rollers 25 hold the racks in engagement with the wheels. The shaft 24 is connected with the main shaft 5 by means of the sprockets 26 and the chain 27. When this shaft 24 is rotated the frame will be raised and lowered by the wheels 23 engaging the racks 22. A drum 28 is journaled in the lower part of the frame 21 and this drum is made large in the middle and tapers towards the end. A plurality of circular saws 29 are carried by said drums, the saws being spaced apart and gradually decreasing in diameter from the center one to the outermost one. This drum is driven from the main shaft 5 by means of the sprockets 30 and chain 31. The sprockets and gears are provided with clutches for connecting them with the shaft 5 and said clutches are operated by hand levers so that they can be moved into operative position manually.

The apparatus is moved to the stump to be removed and the block is raised to place the auger on the top of the stump. The roller gear 7 is then connected with the main shaft so that it will rotate the auger shaft and thus cause the auger to cut away the stump. The weight of the block will cause the auger to feed downwardly as at this time the shaft 15 is disconnected from the shaft 5. I prefer to have the auger cut away the stump to about eight or ten inches below the surface of the ground or a sufficient distance to prevent the plow from striking the part of the stump remaining in the ground. Shaft 15 is then connected with the shaft 5 so as to raise the block and its auger and shaft 8 is freed from shaft 5. The machine is then moved to bring the saw carrying drum over the stump and said drum is lowered and revolved to cause its saws to cut the roots and the remaining part of the stump into small pieces so that they will not interfere with the cultivating of the ground.

By my invention stumps can be easily and quickly cut into small pieces and such pieces can be either plowed under or burned, as desired.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. An apparatus of the class described comprising a wheeled frame, a motor on the frame, means for connecting the drive wheels of the frame with the motor, a slidably mounted block on the frame, an auger shaft rotatably mounted in the block, a roller gear vertically arranged in the frame, a gear on the shaft engaging said roller gear, a horizontally arranged drum, circular saws carried by the drum, a supporting frame for the drum pivotally mounted in the main frame, means for lowering and raising said frame by the motor and means for rotating the drum and the roller gear and raising the block by the motor.

2. An apparatus of the class described comprising a frame, rollers supporting said frame at the front and rear thereof, said rear rollers being driven from the motor of the device located on the frame, a transversely arranged shaft journalled in said frame and geared to the motor shaft, a vertically arranged roller gear journalled in the front part of the frame and connected with said transversely arranged shaft, shafts and gears forming said connection, vertically arranged guideways located at the front of said frame and a block slidably mounted in said guideways, racks formed on the inner face of said block, the second shaft journalled in the front part of said frame, toothed wheels carried by the latter and adapted to engage said racks, means for driving said last mentioned shaft from the first mentioned shaft, a vertically arranged shaft rotatably carried by said block and a toothed wheel carried thereby to engage said vertically arranged roller gear, an auger formed on the lower end of said shaft, said frame being undercut to provide a recess and a roller supporting frame pivotally mounted therein, a drum journalled in the lower part of said supporting frame which tapers toward its end, a plurality of circular saws carried by said drum and spaced apart which gradually decreases in diameter from the center one to the outermost one and means for rotating said drum.

In testimony whereof I affix my signature.

ELMER THOMPSON.